United States Patent [19]

Trümmelmeyer et al.

[11] Patent Number: 4,716,210
[45] Date of Patent: Dec. 29, 1987

[54] USE OF LIQUID, COLD-HARDENING POLYURETHANE-UREA-FORMING COMPONENTS FOR CORROSION-INHIBITING, WEAR-RESISTANT COATINGS ON METAL AND PLASTICS SURFACES AND MOLDINGS AND ON STONE AND CONCRETE

[75] Inventors: Gerhard Trümmelmeyer, Leichlingen; Hans-Dieter Ruprecht, Cologne, both of Fed. Rep. of Germany

[73] Assignee: Bayer Aktiengesellschaft, Leverkusen, Fed. Rep. of Germany

[21] Appl. No.: 446,082

[22] Filed: Dec. 1, 1982

[30] Foreign Application Priority Data

Dec. 10, 1981 [DE] Fed. Rep. of Germany ....... 3148838

[51] Int. Cl.$^4$ ................ C08G 18/10; C08G 18/67
[52] U.S. Cl. ................ 528/75; 521/137; 252/182; 528/64; 528/906
[58] Field of Search ............ 528/75, 64, 906; 521/137; 252/182

[56] References Cited

U.S. PATENT DOCUMENTS

| | | | |
|---|---|---|---|
| 3,723,163 | 3/1973 | Schumacher | 117/72 |
| 4,042,537 | 8/1977 | Dahm et al. | 521/128 |
| 4,267,299 | 5/1981 | Oechsle, III | 528/48 |
| 4,294,934 | 10/1981 | Grogler et al. | 521/160 |
| 4,296,230 | 10/1981 | Pedain et al. | 528/67 |
| 4,303,773 | 12/1981 | Ganster et al. | 528/64 |

FOREIGN PATENT DOCUMENTS 1255989 12/1971 United Kingdom .
1598967  9/1981 United Kingdom .

OTHER PUBLICATIONS

Vieweg & Hochtlen, Kunststoff Handbuch, vol. II, Polyurethane, Carl Hanser Verlag, 1966, pp. 121 to 134, 135 to 205 (for foams) and 206 to 247 (for elastomers).

*Primary Examiner*—Morton Foelak
*Assistant Examiner*—M. L. Moore
*Attorney, Agent, or Firm*—Gene Harsh; Joseph C. Gil; Thomas W. Roy

[57] ABSTRACT

This invention relates to special combinations of polyurethane-urea-forming starting components which are suitable for corrosion-inhibiting wear prevention by casting, centrifugal casting or spraying. Said components are liquid, relatively low viscosity mixtures of polymer-containing or polyadduct-containing polypropylene oxide polyols and/or ethylene oxide-containing polypropylene oxide polyols having a small content of special, low-melting, readily soluble aromatic diamines and tertiary amine catalysts as component (A) which are reacted at room temperature with liquid polyisocyanates based on diphenyl methane diisocyanate or their NCO-prepolymers with polyether polyols as components (B).

12 Claims, No Drawings

USE OF LIQUID, COLD-HARDENING POLYURETHANE-UREA-FORMING COMPONENTS FOR CORROSION-INHIBITING, WEAR-RESISTANT COATINGS ON METAL AND PLASTICS SURFACES AND MOLDINGS AND ON STONE AND CONCRETE

BACKGROUND OF THE INVENTION

1. Field of the Invention

This invention relates to the use of special combinations of polyurethane-urea-forming starting components which provide for the solvent-free processing of components that are liquid at room temperature, show very rapid gelation, are cold-hardening and are eminently suitable for corrosion-inhibiting, wear-resistant coatings applied by casting, centrifugal casting or spraying by means of multicomponent metering units onto large, even vertical metal surfaces and moldings and for lining the interior of tubes and also for the elastic coating of plastics, foams and natural stone and of screed surfaces or concrete.

The components are liquid, relatively low-viscosity mixtures of polymer-containing or polyadduct-containing polypropylene oxide polyols and/or ethylene oxide-containing polypropylene oxide polyols containing special, low-melting, readily soluble aromatic diamines and tertiary amine catalysts as component (A) which are reacted at room temperature with liquid polyisocyanates based on diphenyl methane diisocyanate or based on their NCO-prepolymers with polyether polyols as component (B).

2. Description of the Prior Art

Casting and spraying processes for components forming polyurethane elastomers are known per se, the components also being metered, optionally intermittently by high-pressure delivery units. Processes of this type are described in Vieweg/Hochtlen, KunststoffHandbuch, Vol. VII, Polyurethane, Carl Hanser Verlag, 1966, on pages 121 to 134, 135 to 205 (for foams) and 206 to 247 (specifically for elastomers). Although polyurethanes may be firmly applied to metals by the processes in question, shrinkage problems frequently arise (pages 211–212). One special method of processing glycol-extended elastomers is the spraying process in which for example all the components are simultaneously mixed and sprayed in the same operation. To this end, a few percent of highly active catalysts, such as tin(IV)dibutyl dilaurate or tin(II)octoate, generally have to be added. Unfortunately, these large quantities of tin catalysts lead to elastomers that are sensitive to aging. Where polyethers are used, more favorable elastomer properties are obtained with aromatic diamines as chain extending agents than with diols, although in this case, too, higher temperatures are required for melting, transporting and metering the components and also for after-heating in molds (pages 224 to 228). In the case of spraying processes for coating vertical surfaces, relatively large quantities of very highly active tin catalysts have to be used to prevent the components from running (cf. pages 242 to 244).

DE-A No. 2,928,182 describes cast elastomer systems which show improved processibility through the use of diisocyanate isomer mixtures of from 15 to 80 mole percent of 2,4'-, from 20 to 85 mole percent of 4,4'- and from 0 to 20 mole percent of 2,2'-diisocyanato diphenyl methanes. To this end, an NCO-prepolymer of 1 mole of a relatively high molecular weight dihydroxy or polyhydroxy compound having a molecular weight of from 400 to 10,000 and from 2 to 10 moles of the diisocyanato diphenyl methane isomer mixtures is reacted with an aromatic diamine or, optionally, mixtures thereof with at most 50 mole percent of a polyol containing primary hydroxyl groups and having a molecular weight of from 62 to 6000, after which the resulting reaction mixture is poured into molds, hardened therein and subsequently removed therefrom. Reference is made to the use of inorganic fillers or even organic fillers, for example in the form of styrene/acrylonitrile-grafted polyethers or polyhydrazodicarbonamide dispersions in polyethers for improving the mechanical properties. The use of the diphenyl methane diisocyanate isomer mixtures even enables casting to be carried out by high-pressure machines because the viscosity of the prepolymer is reduced. However, the components are not selected in such a way that they can be metered solely at room temperature or temperatures below room temperature, for example +10° C., or in such a way that they also represent a cold-hardening, non-shrinking system.

U.S. Pat. No. 3,723,163 describes a process for sealing concrete (steel-reinforced concrete) against existing cracks or developing cracks. In this process, an elastic, adhering intermediate layer of a moisture-hardening NCO-prepolymer is applied to the concrete, followed by the application of a harder, wear-resistant polyurethane layer. Each of the layers may contain further polymers, such as styrene, indene resins, tar or the like. This multistage process is time-consuming, complicated and dependent on weather conditions.

DE-A No. 2,051,946 describes the use of bitumen-containing, filler-containing, polyurethane-forming, cold-hardening components for casting or spraying onto substrates, including substrates of concrete. Unfortunately, the mixtures in question do not show the particular processibility in liquid form of the starting materials coupled with rapid hardening, even on vertical surfaces, or their favorable elasticity and hydrolysis properties.

By contrast, the use of the components discovered in accordance with the invention provides for the machine processing of exclusively low-viscosity liquid components at room temperature or even at temperatures below room temperature, such as are encountered on building sites for example, for very rapid gelation of the polyurethane-forming mixture (so that even vertical surfaces can be evenly sprayed), for rapid, cold-hardening (i.e. at normal room or air temperatures) polyurethane formation which takes place in the complete or substantially complete absence of shrinkage and eliminates the need for highly activating tin catalysts (which on the other hand adversely affect aging behavior). The materials according to the invention give high-strength, abrasion-resistant and hydrolysis-resistant polyurethanes which are elastic, even at low temperatures, and which, by virtue of their crack-free, contraction-free and shrinkage-free formation, are eminently suitable for the corrosion-inhibiting, wear-resistant coating of metal surfaces and moldings (for example interior tube linings) and for the elastic coating of screed, (steel-reinforced) concrete and stone. The polyurethane composition according to the invention also bonds very firmly to existing coatings and may be used in multilayer spraying processes. According to the invention, the layers may even be applied in a fairly considerable thickness because the claimed solvent-free composition gels in fractions of a second to only a few seconds after application and may be processed not only on inclined or vertical surfaces, but even overhead. Using rotating mixing heads, it is even possible for example to line the interior of already laid tubes. The polyurethane bonds very firmly to the substrate. The seal is seamless and even covers over cracks subsequently developing in the substrate, thus preventing the escape of such harmful liquids as water, salt solutions or the like. Thus, the process according to the invention is eminently suitable and more favorable than other coating systems for sealing against the effects of moisture, frost and salts formed by condensation in civil engineering structures.

SUMMARY OF THE INVENTION

The present invention relates to a hydrolysis-resistant, low-temperature-resistant, elastic polyurethaneurea of high strength and abrasion resistance for the corrosion-inhibiting, wear-resistant coating of metal and plastics surfaces and moldings and also masonry, screed, steel-reinforced concrete and natural stone by casting or spraying polyurethane-urea-forming components by means of multicomponent metering and mixing units, characterized in that the cold-hardening, quick-gelling, solvent-free, liquid polyurethaneurea-forming components intended for cold processing used in accordance with the invention are (A) a liquid mixture having a viscosity below about 6000 mPa.s at 25° C. and preferably below about 4000 mPa.s/25° C. and an average functionality of the OH— and NH$_2$-groups of from about 2.0 to 2.75 and preferably from about 2.0 to 2.5, comprising (1) a polyether polyol component having a molecular weight of from about 500 to 8000 and preferably from about 1000 to 6000, a functionality of from about 2.0 to 3.3 and preferably from about 2.0 to 3.0 and a viscosity below about 6000, preferably below about 4000 mPa.s/25° C. and, more preferably, below about 2000 mPa.s/25° C., which is (a) graft-modified by about 5 to 40% by weight of polymers and/or copolymers of unsaturated monomers and/or (b) contains from 5 to 40% by weight of high molecular weight polyadducts or polycondensates or polymers in dissolved or finely dispersed form (2) liquid or low-melting aromatic polyamines soluble in (1) and having molecular weights below about 500 in an equivalent ratio of (1) to (2) of from about 1:1 to 1:10 and preferably from about 1:1.1 to 1:3 and (3) aliphatic tert.-amine catalysts, preferably 1,4-diaza-(2,2,2)-tricyclo-octane, in quantities of from about 0.01 to 5% by weight and preferably in quantities of from about 0.1 to 2% by weight; and (B) liquid, aromatic polyisocyanates having an NCO-functionality of from 2.0 to 2.55 and comprising (1) phosgenation products of the condensation reaction of aniline and/or C$_1$–C$_4$-mono- or -di-substituted anilines with formaldehyde or the conversion products of the phosgenation products which are liquid at room temperature and obtained by the introduction of biuret, allophanate or carbodiimide groups, by trimerization or by modification with low molecular weight polyols, and/or (2) reaction products of (1) with polyether polyols having a molecular weight in the range from about 400 to 7000, preferably in the range from about 500 to 5000 and a viscosity below about 8000 mPa.s/25° C., preferably below about 5000 mPa.s/25° C. and, more preferably, below about 3000 mPa.s/25° C., in an equivalent NCO/OH ratio of from 2:1 to 10:1, wherein the equivalent ratio of the isocyanate groups of (B) to the isocyanate-reactive groups of (A) is about 0.95:1 to 1.10:1.

DETAILED DESCRIPTION OF THE INVENTION

It is preferred to use polyurethane-forming starting components in which (A) is a mixture having a viscosity below about 4000 mPa.s/25° C., preferably below about 2000 mPa.s/25° C., and an average functionality of from about 2.0 to 2.5, comprising (1) polyether polyols graft-modified by from about 5 to 40% by weight of polymers and/or copolymers of unsaturated monomers, preferably acrylonitrile, methacrylonitrile, styrene, α-methyl styrene, acrylic and methacrylic acid-C$_1$–C$_4$-alkyl esters, and having a molecular weight of from about 500 to 8000, preferably from about 1000 to 6000, an average functionality of from about 2.0 to 3.3 and a viscosity below about 4000 mPa.s/25° C. and preferably below about 2000 mPa.s/25° C., (2) liquid or low-melting aromatic polyamines soluble in (1) and having a molecular weight below about 500, preferably 2,6-di-(C$_1$–C$_4$)-alkyl-1,3-diamino-4-methyl benzenes and/or 4,6-di-(C$_1$–C$_4$)-alkyl-1,3-diamino-2-methyl benzenes or mixtures thereof and/or asymmetrically alkyl-substituted 4,4'-diaminodiphenyl methanes corresponding to the following general formula

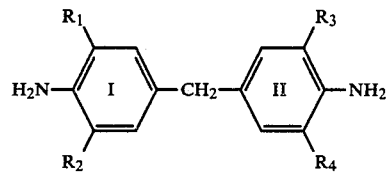

in which

R$_1$ represents hydrogen or an optionally branched alkyl group containing from 1 to 4 carbon atoms, R$_2$ represents an optionally branched alkyl group containing from 1 to 4 carbon atoms, R$_3$ represents hydrogen or an optionally branched alkyl group containing from 1 to 4 carbon atoms and R$_4$ represents an optionally branched alkyl group containing from 2 to 4 carbon atoms, with the proviso that the aromatic nuclei I and II are differently substituted, or mixtures thereof with correspondingly symmetrically alkyl-substituted 4,4'-diaminodiphenyl methanes in proportions of less than 50% by weight, in an OH/NH$_2$ equivalent ratio of (1) to (2) of from about 1:1 to 1:10, preferably from about 1:1 to 1:3, and (3) aliphatic tert.-amine catalysts in quantities of from about 0.01 to 5% by weight; and (B) liquid aromatic polyisocyanates having an average NCO-functionality of from about 2.0 to 2.55 and a viscosity below about 5000, preferably below about 3000 mPa.s/25° C., in the form of the reaction products of 2- to 4-functional propylene oxide and/or propylene oxide/ethylene oxide mixed polyether polyols having a molecular weight in the range from about 500 to 5000 with phosgenation products of the condensation products of formaldehyde and aniline and/or C$_1$–C$_4$-mono- or -di-substituted anilines in an equivalent ratio of OH/-NCO of from about 1:2 to 1:10.

Preferred polyether polyols for the polyether polyols (A, 1) graft-modified by polymers and/or copolymers are polypropylene oxide polyols and/or $C_2$–$C_3$-mixed polyether polyols copolymerized with ethylene oxide or modified by terminal ethylene oxide groups. The ethylene oxide content may vary from about 5 to 80% by weight, but generally amounts to between about 5 and 65% by weight and preferably to between about 10 and 45% by weight. The average OH-functionality amounts to at least 2 and preferably between about 2 and 3.3. Unsaturated monomers, such as acrylonitrile, methacrylonitrile, styrene, α-methyl styrene, acrylic and/or methacrylic acid $C_1$–$C_4$-alkyl esters are (graft)-polymerized in the presence of these polyethers. Graft polymer or copolymer contents of from about 5 to 40% by weight may be used, while graft polymer or copolymer contents of from about 10 to 25% by weight are preferred. Graft polymers of acrylonitrile and styrene in a monomer ratio of from about 40:60 to about 80:20 are particularly preferred. Processes for producing polymer-modified polyols of this type are described in U.S. Pat. Nos. 3,383,351; 3,304,273; 3,523,093 and 3,110,695 and in DE-B No. 1,152,536. The graft polymerization reaction may also be carried out in the presence of small quantities of vinyl phosphonic acid esters and/or OH-functional (meth)acrylic acid esters.

The molecular weights of these polymer-modified polyethers is in the range from about 500 to 8000 and preferably in the range from about 1000 to 6000 while the viscosity is below about 6000 mPa.s/25° C., preferably below about 4000 mPa.s/25° C. and most preferably below about 2000 mPa.s/25° C.

It is also possible to use polyether polyols (A, 1, b) containing from about 5 to 40% by weight and preferably from about 10 to 25% by weight of high molecular weight polyadducts or polycondensates in dissolved or finely dispersed form. Modified polyether polyols of this type are obtained for example by carrying out polyaddition reactions between polyisocyanates and hydrazine, hydrazides, diamines or glycols, or even polycondensation reactions, for example between formaldehyde and phenols and/or amines, in situ in the abovementioned polyether polyols. Corresponding processes are described, for example, in DE-B Nos. 1,168,075 and 1,260,142 and in DE-A Nos. 2,324,134, 2,423,984; 2,515,385; 2,513,815; 2,550,796; 2,550,797; 2,550,833; 2,550,862; 2,633,293 and 2,639,254. However, it is also possible in accordance with U.S. Pat. No. Ser. 3,869,413 and DE-A No. 2,550,864 to mix an aqueous polymer dispersion with a polyhydroxyl compound and subsequently to remove the water from the mixture.

In this case, too, the functionalities, molecular weights and viscosities lie in the ranges indicated above. However, graft-polymer-containing polyols of the (A, 1, a) type are preferred because they are relatively stable and gel very quickly during the spraying and casting reaction.

Known diamines, such as tolylene diamine and/or diphenyl methane diamines (optionally in the form of their isomer mixtures or their $C_1$–$C_4$-monoto tetra-alkyl derivatives) may be used as the liquid or low-melting aromatic polyamines (A, 2) soluble in the polyols (A, 1) and having molecular weights below about 500. However, it is preferred to use 2,6-di($C_1$–$C_4$)-alkyl-1,3-diamino-4-methyl benzenes and/or 4,6-di-($C_1$–$C_4$)-alkyl-1,3-diamino-2-methyl benzenes or mixtures thereof and/or asymmetrically alkyl-substituted 4,4'-diamino diphenyl methanes corresponding to the following general formula

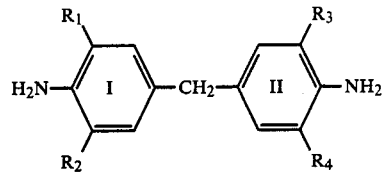

in which
$R_1$ represents hydrogen or an optionally branched alkyl group containing from 1 to 4 carbon atoms,
$R_2$ represents an optionally branched alkyl group containing from 1 to 4 carbon atoms,
$R_3$ represents hydrogen or an optionally branched alkyl group containing from 1 to 4 carbon atoms and
$R_4$ represents an optionally branched alkyl group containing from 2 to 4 carbon atoms, with the proviso that the aromatic nuclei I and II are differently substituted, or mixtures thereof with less than 50 parts by weight of the correspondingly symmetrically alkyl-substituted 4,4'-diamino diphenyl methanes such as are obtained as a product mixture in the reaction of various anilines with formaldehyde in accordance with DE-OS No. 2,920,501.

It is particularly preferred to use 4-methyl-2,6-diethyl-1,3-diaminobenzene and/or 2-methyl-4,6-diethyl-1,3-diaminobenzene and/or 3-ethyl-3'-isopropyl-4,4'-diamino diphenyl methane and/or 3-ethyl-3',5'-diethyl-4,4'-diamino diphenyl methane and/or 3-ethyl-3',5'-diisopropyl-4,4'-diamino diphenyl methane and, above all, 3,5-diethyl-3',5'-diisopropyl-4,4'-diamino diphenyl methane (or product mixtures thereof with symmetrically alkyl-substituted diamines according to DE-OS No. 2,920,501), the first, second and last of the abovementioned diamino compounds or their product mixtures being particularly favorable because their reactivity is less than unsubstituted diamines, such as 2,4-tolylene diamine or 4,4'-diamino diphenyl methane, and their volatilities are low. The first and second of the above-mentioned diethyl tolamines are preferably used in the form of isomer mixtures containing about 60 to 85% by weight of the first compound and about 40 to 15% by weight of the second compound.

These aromatic diamines (A, 2) are mixed with the above-described polymer-modified polyether polyols (A, 1) in an OH/NH$_2$-molar ratio of from about 1:1 to 1:10 and preferably from about 1:1 to 1:3.

The aliphatic tert.-amine catalysts (A, 3) used in accordance with the invention may be catalysts known per se, for example triethylamine, tributylamine, N-methyl morpholine, N,N,N',N'-tetramethyl ethylene diamine, pentamethyl diethylene triamine and higher homologs (DE-A No. 2,624,527 and 2,624,528), N-methyl-N'-dimethylaminoethyl piperazine, bis-(dimethylaminoalkyl)-piperazines (DE-A No. 2,636,787), N,N-dimethyl benzyl-amine, N,N-dimethyl cyclohexyl-amine, bis-(N,N-diethylaminoethyl)-adipate, N,N-dimethyl-β-phenylethylamine, 1,2-dimethyl imidazole, 2-methyl imidazole, monocyclic and bicyclic amidines (DE-A No. 1,720,633), bis-(dialkylamino)-alkyl ethers (U.S. Pat. No. 3,330,782, DE-B No. 1,030,558, DE-A Nos. 1,804,361 and 2,618,280) and tertiary amines containing amide groups (preferably formamide groups) according to DE-A Nos. 2,523,633 and 2,732,292. Other suitable catalysts are Mannich bases known per se of secondary amines (such as dimethylamine) and aldehydes (preferably formaldehyde) or ketones (such as acetone, methyl ethyl ketone or cyclohexanone) and phenols (such as phenol, nonyl phenol or bisphenol).

Tertiary amines containing isocyanate-reactive hydrogen atoms suitable for use as catalysts are, for example, triethanolamine, triisopropanolamine, N-methyl diethanolamine, N,N-dimethyl ethanolamine, or their reaction products with alkylene oxides, such as propylene oxide and/or ethylene oxide.

It is particularly preferred to use 1,4-diaza(2,2,2)-bicyclooctane (Dabco ®) as the catalyst.

Suitable liquid aromatic polyisocyanates (B) are (1) phosgenation products of the condensation reaction of aniline and/or $C_1$–$C_4$-mono- and di-nucleus-alkylated anilines with formaldehyde. Conversion products which are liquid at room temperature and obtained by the introduction of carbodiimide groups, allophanate groups, biuret groups, by trimerization or by modification with low molecular weight polyols may also be used with advantage.

It is preferred to use phosgenation products of the reaction products of aniline with formaldehyde which contain more than about 20% by weight and preferably between about 30 and 50% by weight of the 2,4'-isomers of diisocyanato diphenyl methane and which are liquid. In addition to 4,4'-isomers, they may also contain small percentages (up to about 7%) of 2,2'-isomers and, optionally, polynuclear polyisocyanates. Their viscosity should be below about 1000 mPa.s/25° C. and preferably below about 750 mPa.s/25° C. and may be even distinctly lower in the case of liquid isocyanates, for example 2,4'-diisocyanato diphenyl methane. The average functionality of component (B, 1) should be from about 2.0 to 2.55. Additional suitable liquid aromatic polyisocyanates (B) are (2) the reaction products of the liquid aromatic polyisocyanates (B, 1) with polyether polyols having a molecular weight in the range from about 400 to 7000 in an NCO/OH equivalent ratio of from about 2:1 to 10:1. These reaction products are preferably used as the polyisocyanates (B). These liquid polyisocyanate components (B, 2) have a functionality of from about 2.0 to 2.55 and a viscosity below about 8000 mPa.s/25° C., preferably below about 5000 mPa.s/25° C. and, more preferably, below about 3000 mPa.s/25° C.

Of the NCO-preadducts (2), it is preferred to use reaction products of 2- to 4-functional propylene oxide polyether polyols (c), which may optionally contain from about 5 to 65% by weight of ethylene oxide and which have a molecular weight of from about 400 to 7000 and preferably from about 500 to 5000, with liquid isomer mixtures of diphenyl methane diisocyanates containing more than about 20% by weight and preferably from about 30 to 50% by weight of 2,4'-isomers of diisocyanato diphenyl methane in addition to 4,4'-isomers and, optionally, up to about 7% by weight of 2,2'-isomers.

The reaction is carried out at an NCO/OH-ratio of from about 2:1 to 10:1 and preferably from about 2.5:1 to 6:1. These NCO-prepolymers should also have a functionality of from about 2 to 2.55 and a viscosity below about 8000 mPa.s/25° C. and preferably below about 5000 mPa.s/25° C.

It is particularly preferred to use reaction products of approximately 2 to 2.5-functional polypropylene oxide polyols having a molecular weight of from about 1500 to 2500 with a crude diphenyl methane diisocyanate mixture containing approximately about 30 to 50% by weight of 2,4'-isomers (with the remainder predominantly 4,4'-isomers) as the NCO-preadducts (B)(2).

The polyurethane-forming components according to the invention are best mixed by means of a two-component metering and mixing unit in which the reaction components are separately introduced into a mixing head where they are mixed by a stirrer, a static mixer or by counter-current injection and are subsequently discharged with or without the assistance of air. The reaction components are preferably metered by means of gear pumps or by means of double-acting plunger pumps. Where plunger pumps are used in combination with a static mixer, the reaction mixture may even be discharged after spraying without the assistance of air (airless discharge) by virtue of the high material pressures. The reaction mixture hardens about 10 to 12 seconds after discharge. When sprayed onto vertical surfaces, the material levels smoothly. With normal application, no so-called "teardrops" are formed during the hardening phase.

The materials according to the invention are used for the production of wear-resistant and corrosion-resistant elastic sealing coatings, intermediate layers and underlayers or elastic sealing layers on metals, plastics and, optionally, porous plastics or even on concrete, screed, wood, masonry and natural stone. Plastics which may be coated with the materials according to the invention are, for example, polymers (such as polyethylene, polypropylene, EPDM, polystyrene, ABS-polymers) or polycondensates (such as polyamides, polyesters, polysulfides or polyethers) or phenol- and amine-formaldehyde resins, epoxide or UP resins, and also foams, for example polyurethane-, polystyrene-, polyethylene- or polyamide-based foams.

Examples of applications are the coating and, optionally, sealing of large metal surfaces, such as the coating of sheet pile walls, ships decks or holds, wagons, bunkers, lorries, sieve chambers, side walls of vibrating troughs, suspension separators (hydrocyclones), chutes, conveying troughs, containers of all kinds (for example for the transport of corrosive liquids or bulk materials), the noise insulating external coating of the drums of refuse vehicles, the wear-resistant coating of chutes for emptying ready-mixed concrete vehicles, the coating of sheetmetal roofs, flat roofs and the like.

Another important application is the internal and external coating of tubes. It is also possible to use filler-containing compositions in the form of non-slip coverings, for example for gangways, ships decks, working platforms, etc.

Polyurethane or polyethylene foams may be provided for example with an outer skin.

Particular importance is attributed to the application of the polyurethane-forming components by spraying to screed and (steel-reinforced) concrete to form a seamless, elastic sealing layer which prevents the penetration of highly corrosive substances. By virtue of the high elasticity and elongation of the polyurethane elastomer according to the invention over a relatively wide outside temperature range, the sealing function is guaranteed, even in the event of considerable variations in temperature. In addition, gases (air, water vapor) ascending from the substrate are unable to bring about any capillary formation by virtue of the rapid hardening of the reaction mixture. By virtue of these properties, the polyurethane elastomer according to the invention has particular advantages over bonventional materials, such as the slowhardening polyurethane combinations described in U.S. Pat. No. 3,723,163 and in DE-A No. 2,051,956 (of which the processing is labor-intensive and therefore expensive and dependent to a large extent on weather conditions) when it comes to sealing steel-reinforced concrete structures such as, for example, flat roofs, domes, motorway approaches, balconies and other constructions.

In addition, the coating materials according to the invention may be used for sealing flat concrete roofs and intermediate ceilings, particularly where moisture traps are present (below the screed).

EXAMPLES

EXAMPLE 1

(Component A)

(1)

80 parts by weight of a polyether which has been obtained by the addition of propylene oxide (80 mol %) and ethylene oxide (20 mol %) with trimethylol propane (molecular weight approximately 4800) and in which a mixture of styrene/acrylonitrile in a ratio by weight of 20:80 has been reacted under graft polymerization conditions so that a graft content of 20% by weight is formed; viscosity of the polyol thus modified = 3000 mPa.s/20° C., OH-number 28.

(2)

20 parts by weight of an isomer mixture of 3,5-diethyl-3',5'-diisopropyl-4,4'-diamino diphenyl methane, 3,3',5,5'-tetraethyl-4,4'-diamino diphenyl methane and 3,3',5,5'-tetra-isopropyl-4,4'-diamino diphenyl methane (56:22:22).

(3)

0.1 part by weight of 1,4-diaza-(2,2,2)-bicyclooctane. Components (A/1-3) are stirred.

Component (B)

Component (B) is an NCO-preadduct (viscosity 3100 mPa.s/20° C.) obtained by reacting 62 parts by weight of a polyisocyanate produced by phosgenating condensation products of aniline and formaldehyde (containing 40% by weight of 2,4'-isomer and having an NCO-content of 31.5% and a viscosity of 50 mPa.s (20° C.), with 100 parts by weight of a polyol obtained by the addition of propylene oxide with propylene glycol (molecular weight 2000) so that an isocyanate content of 10% by weight is formed in the NCO-preadduct.

74 parts by weight of component (B) are thoroughly mixed with 100 parts by weight of component (A).

Mixing was carried out by means of a two-component metering and mixing unit in which the reaction components were separately introduced into a mixing head where they were mixed either by a stirrer (or in other experiment by a static mixer with same results) snd subsequently discharged. The reaotIon mixture hardens 15 seconds after discharge of the mixture. When the material was sprayed onto vertical metal surfaces, it leveled smoothly and, with normal application, no so-called "teardrops" were formed during hardening. The mechanical properties are set out in the Table.

EXAMPLE 2

The prooedure is as in Example 1 except that a polyhydrazodioarbonamide-modified trifunctional polyol containing 20% by weiqht of filler and having an OH-numher of 28 is used instead of the styrene/acrylonitrile graft polyether. It was obtained by reacting in a polyether - formed by the addition of propylene oxide (80 mol %) with trimethylolpropane and end-capping with 20 mol % of ethylene-oxide - hydrazine and 2,4-tolylene diisocyanate in substantially equivalent quantities to yield the filler-substance. The mechanical properties are set out in the Table.

EXAMPLE 3

(Component A)

(1)

80 parts by weight of a polyhydrazodicarbonamide-modified polyol containing 20% by weight of filler and having an OH number of 28 according to Example 2.

(2)

20 parts by weight of a 65:35 mixture of 4-methyl-2,6-diethyl-1,3-diaminobenzene and 2-methyl-4,6-diethyl1,3-diaminobenzene.

(3)

0.1 part by weight of 1,4-diaza-(2,2,2)-bicyclooctane. Components (A/1-3) are stirred.

Component (B)

Component (B) is an NCO-preadduct (viscosity 3100 mPa.s/20° C.) obtained by reacting 62 parts by weight of a polyisocyanate produced by phosgenating condensation products of aniline and formaldehyde (containing 40% by weight of 2,4'-isomer and having an NCO-content of 31.5% and a viscosity of 50 mPa.s/20° C. with 100 parts by weight of a polyol obtained by the addition of propylene oxide with propylene glycol (molecular weight 2000) so that an isocyanate content of 10% by weight is obtained in the NCO-preadduct.

22 parts by weight of component (B) are thoroughly mixed with 100 parts by weight of component (A). Mixing was carried out in a two-component metering and mixing unit in which the reaction components were separately introduced into a mixing head where they were mixed either by a stirrer or by a static mixer and subsequently discharged. The reaction mixture hardens 15 seconds after discharge. When sprayed onto vertical metal surfaces, the material leveled smoothly and, with normal application, no teardrop formation occurs during hardening. The mechanical properties are set out in the Table.

EXAMPLE 4 (Comparison with Examples 1 and 2)

Component (A)

(1)

80 parts by weight of a polyether obtained by the addition of propylene oxide and ethylene oxide with trimethylol propane (molecular weight approximately 4800, OH-number 35).

(2)

20 parts by weight of the amine mixture of Example 1, (A, 2).

(3)

0.2 part by weight of 1,4-diaza-(2,2,2)-bicyclooctane and 0.2 part by weight of a 1:1-complex of 1,2-dimethyl hexahydropyrimidine and dibutyl tin dilaurate.

Components (A/1-3) are stirred.

Component (B)

Component (B) is the NCO-preadduct having an isocyanate content of 10% by weight described in Example 1.

77 parts by weight of component (B) are thoroughly mixed with 100 parts by weight of component (A).

The mechanical properties are set out in the Table.

| Mechanical Properties (As determined on 4 mm thick layers) | | Examples 1 to 3 (according to the invention) | Comparison Example 4 (ordinary polyether) |
|---|---|---|---|
| Density | (DIN 53473; kg/m$^3$) | 800-1000 | 800 |
| Shore-A-hardness | (DIN 53505) | 65-85 | 55 |
| Tensile strength | (DIN 53504; MPa) | 8-12 | 4.5 |
| Modulus 100% | (DIN 53504; MPa) | 3-5.1 | 1.9 |
| Modulus 300% | (DIN 53504; MPa) | 7-9.1 | 3.8 |
| Breaking elongation | (DIN 53504; %) | 300-400 | 383 |
| Tear propagation resistance | (DIN 53515; kN/m) | 14-25 | 8.7 |
| Loss through abrasion | (DIN 53516; mg) | 130-180 | 543 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A hydrolysis-resistant, low temperature-resistant, elastic polyurethane-urea possessing high strength and abrasion resistance prepared from coldhardening, quick-gelling, solvent-free, liquid components comprising (A) a liquid mixture having a viscosity below about 6,000 mPa.s/25° C. and an average functionality of the hydroxyl group and amino group compounds of about 2.0 to 2.75 comprising (1) a polyether polyol component having an average molecular weight of about 500 to 8,000 and a viscosity below about 6,000 mPa.s/25° C. which is (a) graft modified with about 5 to 40% by weight of polymers and/or copolymers of unsaturated monomers and/or (b) contains from about 5 to 40% by weight of high molecular weight polyadducts, polycondensates or polymers in dissolved or finely dispersed form;

(2) liquid or low melting aromatic polyamines soluble in (1) and having a molecular weight below about 500 wherein the OH/NH2 equivalent ratio of (1) to (2) is from about 1:1 to 1:10; and (3) aliphatic tertiary amine catalysts in quantities from about 0.01 to 5% by weight; and (B) liquid aromatic polyisocyanates having an average isocyanate functionality of from about 2.0 to 2.55 comprising (1) phosgenation products of the condensation reaction of aniline and/or $C_1$-$C_4$-mono- or -di-substituted anilines with formaldehyde or the conversion products of said phosgenation products which are liquid at room temperature and are obtained by the introduction of carbodiimide, allophanate or biuret groups, by trimerization or by modification with low molecular weight polyols, said phosgenation products or said conversion products having a viscosity below about 1000 mPa.s/25° C. and/or (2) reaction products of (B) (1) with a polyether polyol having a molecular weight from about 400 to 7000 at an NCO/OH equivalent ratio of about 2:1 to 10:1, said reaction products having a viscosity below about 5000 mPa.s/25° C., wherein the equivalent ratio of the isocyanate groups of (B) to the isocyanate-reactive groups of (A) is about 0.95:1 to 1.10:1.

2. The polyurethane-urea of claim 1 wherein component (A) has a viscosity below about 4000 mPa.s/25° C. comprising (1) a polyether polyol component having a viscosity below about 4000 mPa.s/25° C. and an average functionality of about 2 to 3.3 wherein said polyether polyol component is graft modified with about 5 to 40% by weight of polymers and/or copolymers of unsaturated monomers, and component (B) has a viscosity of below about 5000 mPa.s/25° C. and comprises component (B)(2) wherein said reaction product of (1) is based on said phosgenation products and a polyether polyol which has a functionality of about 2 to 4 and is based on propylene oxide and optionally about 5 to 65% by weight of ethylene oxide.

3. The polyurethane-urea of claim 2 wherein said polyether polyol component (A)(1) has an average molecular weight of about 1000 to 6000 and is based on a propylene oxide- and optionally ethylene oxidecontaining polyether polyol which is (a) graft modified with from about 5 to 40% by weight of polymers and/or copolymers of acrylonitrile, methacrylonitrile, styrene, α-methyl styrene, acrylic acid-$C_1$-$C_4$-alkyl esters or methacrylic acid-$C_1$-$C_4$-alkyl esters.

4. The polyurethane-urea of claim 3 wherein component (A)(1)(a) comprises a copolymer of acrylonitrile and styrene.

5. The polyurethane-urea of claim 2 wherein component (A)(2) comprises 2,6-di-($C_1$-$C_4$)-alkyl1,3-diamino-4-methyl benzenes, 4,6-di-($C_1$-$C_4$)alkyl-1,3-diamino-2-methyl benzenes or mixtures thereof and/or asymmetrically substituted 4,4'-diamino diphenyl methanes corresponding to the following general formula

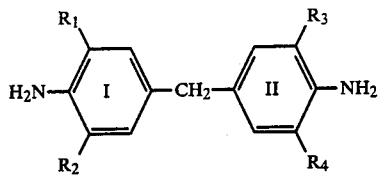

in which
R$_1$ represents hydrogen or an optionally branched alkyl group containing from 1 to 4 carbon atoms,
R$_2$ represents an optionally branched alkyl group containing from 1 to 4 carbon atoms,
R$_3$ represents hydrogen or an optionally branched alkyl group containing from 1 to 4 carbon atoms and
R$_4$ represents an optionally branched alkyl group containing from 2 to 4 carbon atoms, with the proviso that the aromatic nuclei I and II are differently substituted.

6. The polyurethane-urea of claim 2 wherein component (A)(2) comprises isomer mixtures of 4-methyl2,6-diethyl-1,3-diamino benzene and 2-methyl-4,6-diethyl-1,3-diamino benzene.

7. The polyurethane-urea of claim 2 wherein component (A)(2) comprises a member selected from the group consisting of 3-ethyl-3'-isopropyl-4,4'-diamino diphenyl methane, 3-ethyl-3',5'-diethyl-4,4'-diamino diphenyl methane and 3,5-diethyl-3',5'-diisopropyl4,4'-diamino diphenyl methane, optionally in admixture with up to 50% by weight of the corresponding symmetrical alkyl-substituted 4,4'-diamino diphenyl methanes.

8. The polyurethane-urea of claim 2 wherein component (A)(2) comprises isomer mixtures of from about 60 to 85% by weight of 4-methyl-2,6-diethyl-1,3-diamino benzene and from about 40 to 15% by weight of 2-methyl-4,6-diethyl-1,3-diamino benzene.

9. The polyurethane-urea of claim 1 wherein said phosgenation products are phosgenation products of the condensation reaction of aniline with formaldehyde containing more than 20% by weight of 2,4'-isomers of diphenyl methane diisocyanate.

10. The polyurethane-urea of claim 2 wherein said phosgenation products are phosgenation products of the condensation reaction of aniline with formaldehyde containing from about 30 to 50% by weight of 2,4'-isomers of diphenyl methane diisocyanate and the NCO-/OH molar ratio of component (B)(2) is from about 2:1 to 6:1.

11. The polyurethane of claim 2 wherein component (B)(2) is the reaction product of a 2- to 2.5-functional polypropylene ether polyol having a molecular weight of from about 1500 to 2500 and a mixture of diphenyl methane diisocyanate containing from about 30 to 50% by weight of 2,4'-isomers with the remainder predominantly the 4,4'-isomers.

12. A coated substrate wherein the coating comprises the polyurethane-urea of claim 1.

* * * * *